United States Patent
Moog et al.

(10) Patent No.: US 6,558,084 B2
(45) Date of Patent: May 6, 2003

(54) DEVICE FOR CONNECTING A SUBMERGED FLUID-TRANSPORTING LINE

(75) Inventors: Olivier Moog, Aspach-le-Haut (FR); Sylvain Thuet, Roderen (FR)

(73) Assignee: Techlam, Cernay (FR)

( * ) Notice: Subject to any disclaimer, the term of this patent is extended or adjusted under 35 U.S.C. 154(b) by 99 days.

(21) Appl. No.: 09/828,955

(22) Filed: Apr. 10, 2001

(65) Prior Publication Data

US 2001/0031174 A1 Oct. 18, 2001

(30) Foreign Application Priority Data

Apr. 17, 2000 (FR) .......................................... 00 04913

(51) Int. Cl.[7] .............................. E02D 5/74; F16B 21/00
(52) U.S. Cl. ................. 405/224; 405/195.1; 405/223.1; 285/18; 285/123.1; 285/317; 114/230.3
(58) Field of Search ...................... 405/195.1, 169, 405/170, 171, 224, 223.1, 224.1–224.4; 285/18, 39, 310, 312, 317, 123.1, 320; 166/338, 344, 345, 367, 352–354; 441/3–5; 403/322.3, 326, 330

(56) References Cited

U.S. PATENT DOCUMENTS

| | | | | |
|---|---|---|---|---|
| 3,675,713 A | * | 7/1972 | Watkins | 285/18 X |
| 3,709,291 A | * | 1/1973 | Hanes et al. | 405/191 |
| 3,841,665 A | | 10/1974 | Capot | |
| 4,068,868 A | | 1/1978 | Ohrt | |
| 4,093,281 A | * | 6/1978 | Jansen, Jr. | 285/334 X |
| 4,120,171 A | * | 10/1978 | Chateau et al. | 166/352 X |
| 4,199,847 A | | 4/1980 | Owens | |
| 4,371,291 A | | 2/1983 | Morrill et al. | |
| 4,604,961 A | * | 8/1986 | Ortloff et al. | 114/230 |
| 4,751,968 A | * | 6/1988 | Ames et al. | 166/368 |
| 4,892,495 A | * | 1/1990 | Svensen | 441/5 |
| 4,907,914 A | | 3/1990 | Gunderson et al. | |
| 4,940,362 A | * | 7/1990 | Paulshus et al. | 405/224 |
| 4,943,188 A | | 7/1990 | Peppel | |
| 5,318,385 A | | 6/1994 | Goulart et al. | |
| 5,324,141 A | * | 6/1994 | Hunter et al. | 405/223.1 |
| 5,339,760 A | * | 8/1994 | Korsgaard | 114/230 |
| 5,947,642 A | | 9/1999 | Teixeira et al. | |
| 6,193,441 B1 | * | 2/2001 | Fisher | 405/224.4 |

FOREIGN PATENT DOCUMENTS

| | | | | |
|---|---|---|---|---|
| FR | 2 689 603 | | 10/1993 | |
| FR | 2 780 763 | | 1/2000 | |
| GB | 2 162 799 A | | 2/1986 | |
| GB | 2173160 | * | 10/1986 | 114/293 |
| GB | 2186043 | * | 8/1987 | 285/320 |
| GB | 2 202 021 A | | 9/1988 | |

* cited by examiner

*Primary Examiner*—Jong-Suk Lee
(74) *Attorney, Agent, or Firm*—Bacon & Thomas, PLLC

(57) ABSTRACT

A connection device for connecting a submerged tubular structure to a floating support structure. The connection device includes first and second tubular connection elements that connect the submerged tubular structure to the floating support structure. The first tubular connection element cooperates with the second tubular connection element to form a first axial abutment in a pulling direction in which the submerged tubular structure is pulled, and a second axial abutment in a direction opposite from the pulling direction. The device further includes a locking and tensioning device that includes at least one actuator secured to the floating support structure and is mounted to pivot on the second tubular connection element about a hinge axis and against the effect of a return spring surrounding the pin so as to enable the first tubular connection element to snap-fasten onto the second tubular connection element.

5 Claims, 6 Drawing Sheets

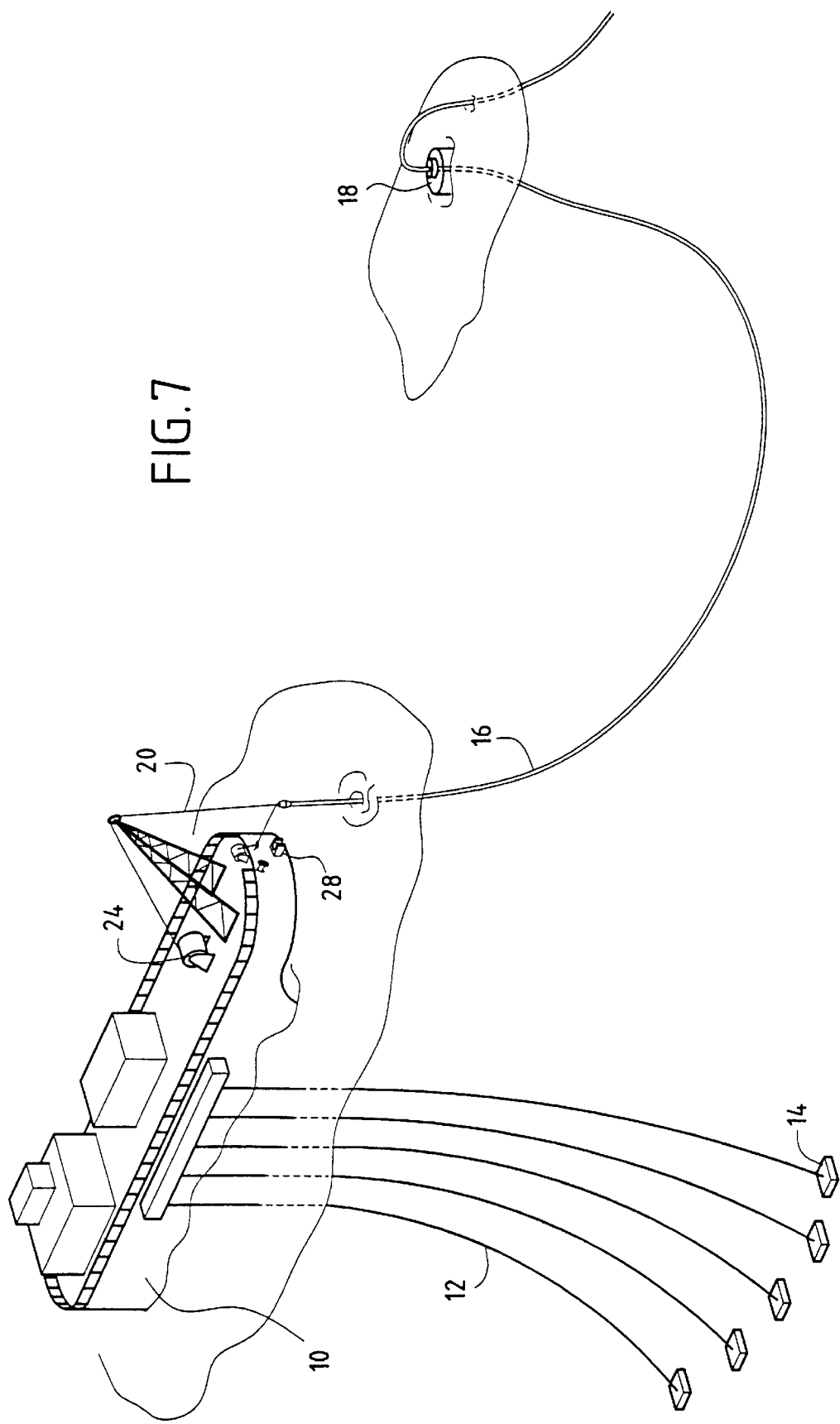

DEVICE FOR CONNECTING A SUBMERGED FLUID-TRANSPORTING LINE

TECHNICAL FIELD

The present invention relates to the offshore petroleum industry, and it relates more particularly to systems for connecting submerged fluid-transporting lines (all types of "risers") to floating supports (of the following types: floating production, storage and offloading (FPSO) unit; tension leg platform (TLP), submersible pipe-alignment rig (SPAR), buoy, etc.).

PRIOR ART

FIG. 7 is a very diagrammatic view of a portion of an offshore petroleum installation. A floating production, storage and offloading (FPSO) unit, referenced 10, is in general disposed immediately above the oil or gas field to be tapped. Tubular structures 12 or "risers" connect the various well heads 14 of the field to the floating support. Rigid offloading lines lead away from this floating unit (e.g. the transport line 16) for offloading the petroleum fluid to tanker ships (not shown) for transporting it. For safety reasons, these tankers are relatively far away from the floating unit 10 and the coupling between the unit and a tanker thus goes via a relay mooring constituted by a semi-submerged buoy 18.

Because the positioning of the FPSO unit and of the buoy can vary, in particular in the presence of heavy swell (horizontal variations over a distance of 150 meters (m) are then common), the various connections connecting the risers and transport lines to the FPSO unit or to the buoy must offer a certain amount of flexibility. U.S. Pat. No. 4,943,188 and U.S. 4,907,914 show hinged means that are well suited to riser connections.

However, and as shown very diagrammatically in FIG. 6, an offloading line 16 for transporting petroleum fluid is currently hooked up to the FPSO unit 10 by means of two pulling lines 20, 22 fixed to one end of the transport line and that need to be displaced in two different directions (by means of respective winches 24, 26) so that the transport line 16 can be hooked up exactly to cradle receptacles 28 carried by the FPSO unit.

Unfortunately, such a traditional hooking-up principle is particularly difficult to implement in an installation at sea. In addition, possible interference between the pulling lines and the installations of the FPSO unit or the anchor chains of said unit does not facilitate such hooking-up.

DEFINITION AND OBJECT OF THE INVENTION

An object of the present invention is to mitigate the above-mentioned drawbacks by proposing a connection system that is particularly easy to install. Another object of the invention is to obtain a system that is reliable over time. Yet another object of the invention is to provide a system that can operate regardless of the type of transport line used.

These objects are achieved by a connection device for connecting a submerged tubular structure to a floating support structure, said connection device comprising a first tubular connection element and a second tubular connection element concentric with said first element, the connection elements being connected respectively to one end of the submerged tubular structure, and to the floating support structure, wherein, with said first tubular connection element being provided firstly with a first shoulder serving to cooperate with a corresponding first abutment face of said second tubular connection element to form a first axial abutment in a pulling direction (T) in which the submerged tubular structure is pulled, and secondly with a second shoulder serving to co-operate with a corresponding second abutment face of said second tubular connection element to form a second axial abutment in a direction opposite from said pulling direction (T), said connection device further comprises locking and tensioning means mounted between said first and second tubular connection elements to act, by putting said first and second shoulders simultaneously in contact with said first and second abutment faces, to provide coupling with zero axial clearance between said two connection elements.

With this particular structure, a single pulling line suffices to install a fluid-transporting line (the submerged tubular structure), the locking means guaranteeing that the forces are distributed as a function of the dynamic loads between the floating support structure and the transport line.

Preferably, the locking and tensioning means comprise at least one actuator secured to said floating support structure. The actuator is mounted to pivot on said second tubular connection element about a hinge axis and against the effect of a return spring surrounding said pin, so as to enable said first tubular connection element to be snap-fastened onto said second tubular connection element.

In order to guarantee tensioning of the coupling over time, the locking and tensioning means further comprise at least one stay put in place at zero clearance and at a predetermined tensioning force by replacing said at least one actuator.

Advantageously, the locking and tensioning means comprise a plurality of actuators distributed uniformly about the second tubular connection element, a stay being disposed between each actuator.

In a preferred embodiment, the first tubular connection element is connected to the end of the submerged tubular structure via hinge means. The hinge means advantageously comprise at least one spherical laminated abutment.

BRIEF DESCRIPTION OF THE DRAWINGS

Other characteristics and advantages of the present invention appear more clearly from the following description given by way of non-limiting indication and with reference to the accompanying drawings, in which:

FIG. 7 is a simplified diagram showing a system for working a petroleum field in deep water.

DETAILED DESCRIPTION OF A PREFERRED EMBODIMENT

Figure 1:
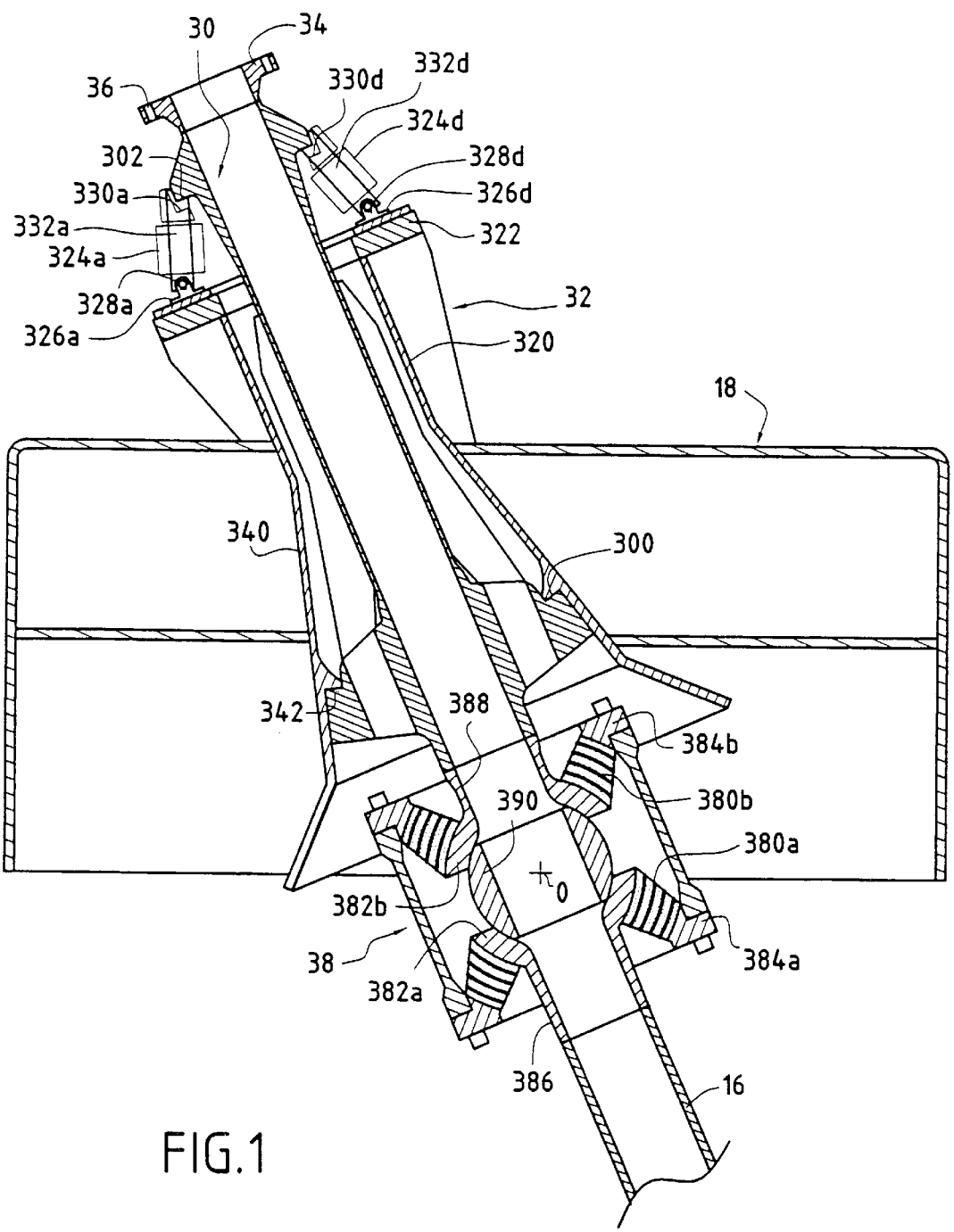
FIG. 1 is a longitudinal section view of a first embodiment of a connector of the invention.

A first embodiment of a connector of the invention that serves to connect an offloading line 16 for transporting a petroleum fluid to a mooring buoy 18 is shown in FIG. 1.

This connector includes a first tubular connection element (the male portion 30) serving to be connected to the transport line 16E and a second tubular connection element (the corresponding female portion or "i-tube" 32) that is concentric with the first portion and that is carried by a body portion of the buoy or "buoyancy tank" 18.

A first end of the male tubular portion is fixed, e.g. by welding, to a flange collar 34 whose flange is provided with through orifices 36 for receiving fixing elements for fixing to a pulling line head (not shown). An opposite second end of the male tubular portion is fixed, e.g. by welding, to a first end of hinge means having a spherical laminated abutment 38 whose second end is fixed, e.g. by welding, to the transport line 16 for transporting the fluid under extraction.

In the example shown, the hinge means are constituted by a conventional flexible assembly incorporating two spherical laminated abutments 380a, 380b mounted in opposition, each of which is made up of rigid layers, e.g. metal layers, in alternation with elastomer layers, the various layers being stuck together. Each of the abutments is received between a first frame 382a, 382b in the form of a spherical cap and a second frame 384a, 384b in the form of a ring. Each spherical cap extends a first tubular portion 386 or a second tubular portion 388 of the assembly, which portion serves to be fixed respectively to the transport line 16 or to the male portion 30 of the connector. The two rings are connected together in fixed manner, e.g. by screwing. The spherical surfaces of the faces of the layers of the two abutments and of the faces of the caps and of the rings between which the abutment is disposed have a common center O situated on the axis of the hinge means. Internally, the spherical caps 382a, 382b of the two abutments co-operate with a spherical stopper 390 centered on the point O to avoid putting the laminated abutments under traction.

The male tubular portion proper of the connector has a hollow cylindrical shape with, at its bottom, a first annular shoulder 300 forming a stop ring and serving to limit the axial movement of the male connector portion 30 in a first direction (the pulling direction T in which the transport line 16 is pulled) relative to the female connector portion 32, and, at its top, a second annular shoulder 302 also forming a stop ring and serving to limit the axial movement of the male connector portion 30 in a second direction opposite from the first direction, relative to the corresponding portion of the female connector portion 32.

The female connector portion comprises a tubular portion 320 that is circular in section, that constitutes a receptacle (or "i-tube") for the male connector tube, and that is secured, e.g. by welding, to a structural portion of the buoy 18.

At its top end, this tubular portion is provided with an annular rim 322 forming a support for locking and tensioning means formed by hinged actuators (e.g. four actuators 324a–324d) distributed uniformly around its circumference. Each actuator is conventionally formed by a cylinder-and-piston assembly (the feed circuit of the actuator is not shown but is naturally essential) and is hinged to pivot (about a hinge pin 326a–326d and against the effect of a return spring 328a–328d surrounding said pin) at a portion of the cylinder in contact with the rim. At its free top, its piston is provided with an abutment face 330a–330d serving to receive the second annular shoulder 302 and thus to form an axial abutment for the male connector in the direction opposite from the pulling direction. Between each actuator, stays (e.g. four stays 332a–332d) are uniformly disposed. Each stay slopes appropriately and is provided with a hinged foot 334a–334d which stands on a base 336a–336d and is held thereon by means of a wedge 338a–338d (see FIG. 3).

At its bottom end, the tubular portion 320 is flared to form a guiding and docking cone 340. On its inside, the cone is provided with a circular rib 342 serving to co-operate with the first shoulder 300, and thus to form another axial abutment for the male connector, in the direction in which the transport line 16 is pulled. The distance between the two axial abutments on the female connector portion is naturally determined to correspond (ignoring operating axial clearance) to the distance between the shoulders on the male connector portion.

Figure 2A:
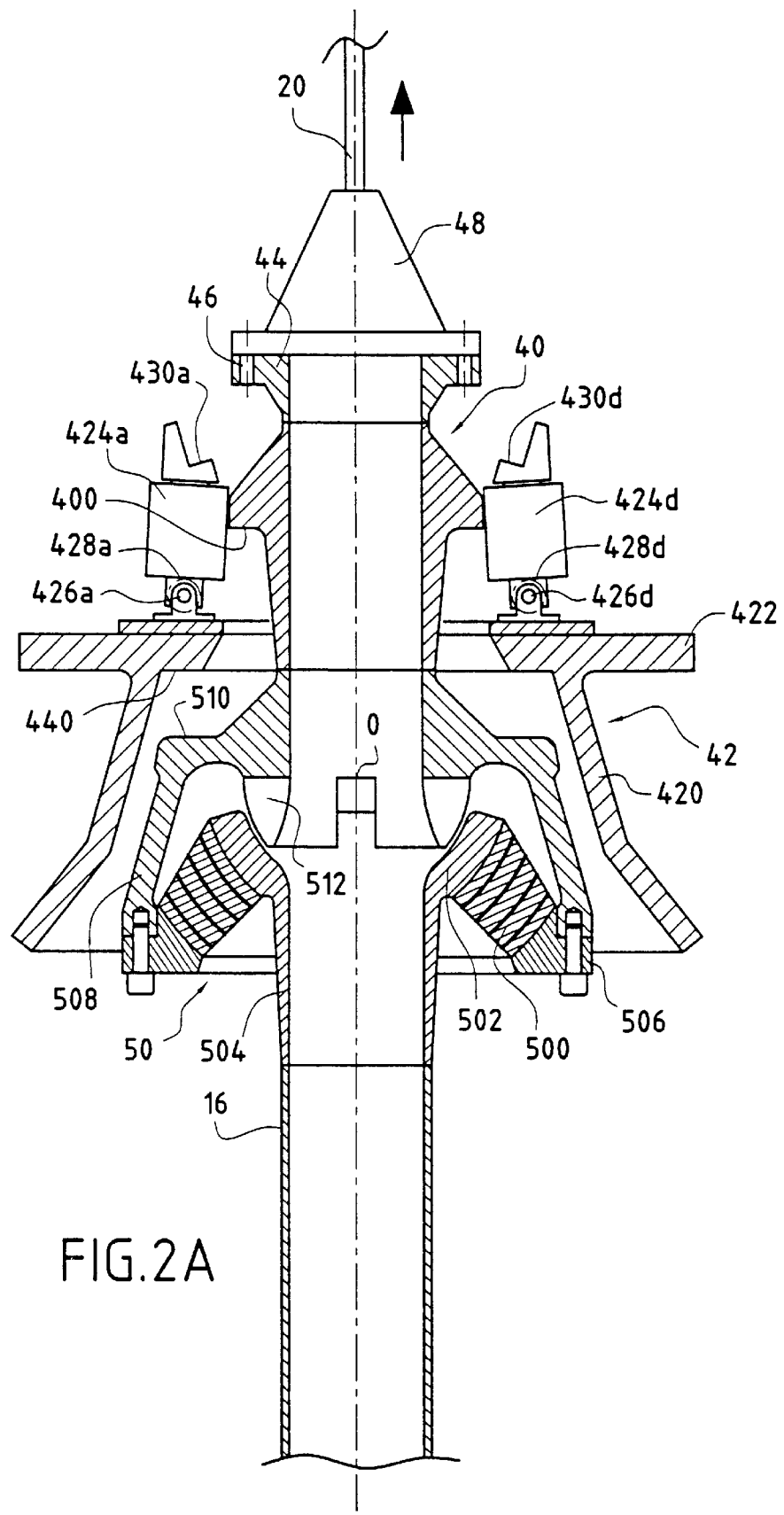
FIGS. 2a, 2b, and 2c are longitudinal section views of a second embodiment of a connector of the invention, shown in different consecutive positions.
Figure 2C:
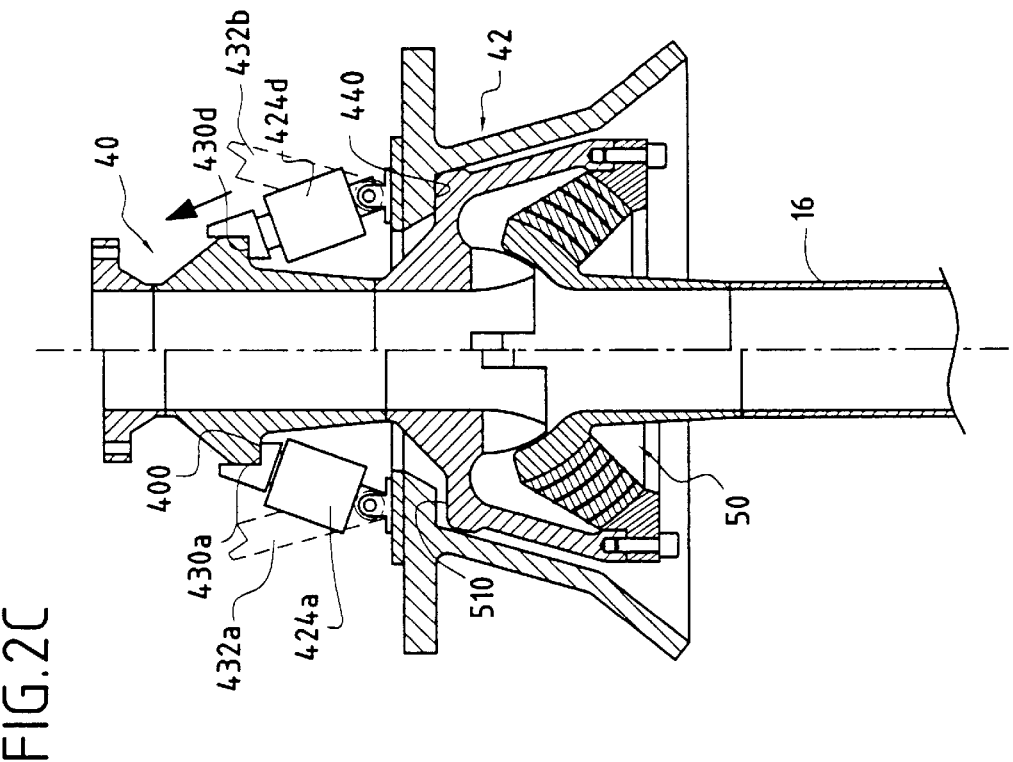
Figure 2B:
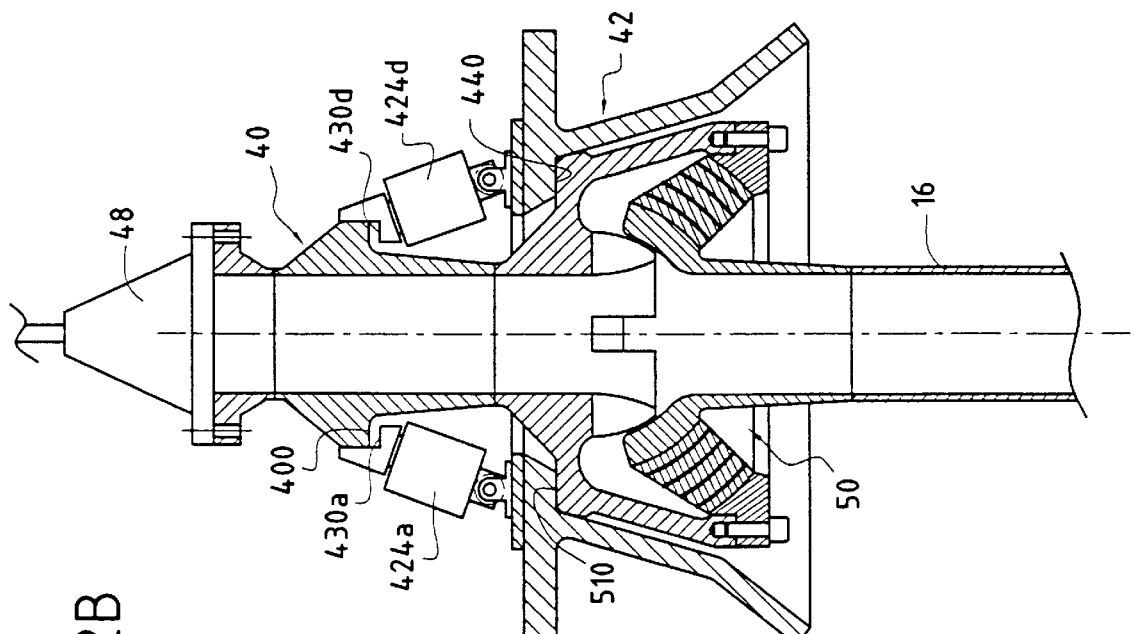
Figure 6:
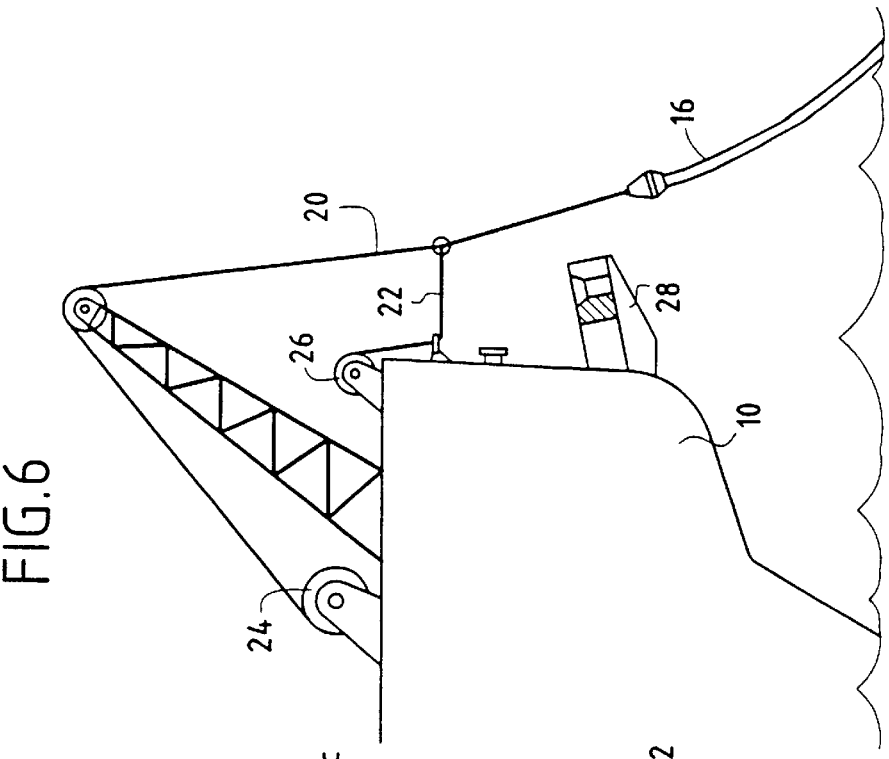
FIG. 6 shows the prior art technique for hooking up transport lines.

A second embodiment of a connector of the invention serving to connect a transport line 16 for transporting a petroleum fluid to a floating support 10 of the FPSO unit type is shown in FIGS. 2a to 2c.

As above, this connector comprises a first tubular connection element (the male portion 40) serving to be connected to the transport line 16, and a second tubular connection element (the corresponding female portion 42) carried by a structural fixed portion of the FPSO unit 10.

A first end of the male tubular portion is fixed, e.g. by welding, to a flange collar 44 whose flange is provided with through orifices 46 for receiving fixing elements for fixing to a head 48 of a single pulling line 20. An opposite second end of the male tubular portion is fixed, e.g. by welding, to a first end of hinge means having a spherical laminated abutment 50 whose second end is secured, e.g. by welding, to the transport line 16.

The hinge means are constituted by a conventional flexible joint assembly incorporating a laminated hinge abutment 500 made up of rigid layers, e.g. metal layers, in alternation with elastomer layers, the various layers being stuck together. This abutment is received between a frame 502 in the form of a spherical cap secured to a first tubular portion 504 of the assembly, which portion serves to be fixed to the transport line 16, and a frame 506 constituted by a ring connected in fixed manner, e.g. by screwing, to a second tubular portion 508 of the assembly, which portion serves to be fixed to the male portion 40 of the connector. The faces of the layers of the abutment and the faces of the cap and of the ring between which the abutment is disposed have concentric spherical surfaces centered on a common point O situated on the axis of the flexible hinge (which axis coincides with the axis of the transport line when said line is locked onto the floating installation). The second tubular portion of the assembly 508 is bell-shaped in overall external shape with an external annular shoulder 510 forming a base and serving to limit the axial movement of the male connector portion 40 in a first direction (the pulling direction T in which the transport line is pulled, indicated by the arrow) relative to the corresponding portion of the female connector portion 42. Internally, this tubular portion is provided with a spherical portion 512 which serves to co-operate with the spherical cap 502 to avoid putting the laminated abutment under tension.

The male tubular portion proper of the connector is merely a hollow cylinder having an external central portion provided with an annular shoulder 400 forming a stop ring serving to limit the axial movement of the male connector portion 40 in a second direction, opposite from the preceding direction, relative to the corresponding portion of the female connector portion 42.

This female connector portion comprises a tubular portion 420 that is circular in section, that constitutes a receptacle for the male connector portion, and that is secured, e.g. by welding, to a structural portion of the FPSO unit.

At its top end, this tubular portion is provided with an annular rim 422 forming a support for locking and tensioning means formed by hinged actuators (e.g. four actuators 424a–424d) distributed uniformly around its circumference. Each actuator is conventionally formed by a cylinder-and-piston assembly (the feed circuit of the actuator is not shown but is naturally essential) and is hinged to pivot (about a hinge pin 426a–426d and against the effect of a return spring 428a–428d surrounding said pin) at a portion of its cylinder in contact with the rim. At its free top, its piston is provided with an abutment face 430a–430d serving to receive the annular shoulder 400 and thus to form an axial abutment for the male connector in the direction opposite from the pulling direction. Between each actuator, and as in the preceding embodiment shown in FIG. 3, stays (e.g. four stays 432a–432d) are uniformly disposed. Each stay slopes appropriately and is provided with a foot 434a–434d which stands on a base 436a–436d and is held thereon by means of a wedge 438a–438d.

At its bottom end, the tubular portion 420 is flared to form a guiding and docking cone. On its inside, the tubular portion is further provided with a circular rib 440 serving to co-operate with the shoulder 510 to form an axial abutment for the male connector, in the direction in which the transport line is pulled. The distance between the two axial abutments on the female connector portion is naturally determined to correspond (ignoring operating axial clearance) to the distance between the shoulders on the male connector portion.

Figure 3:
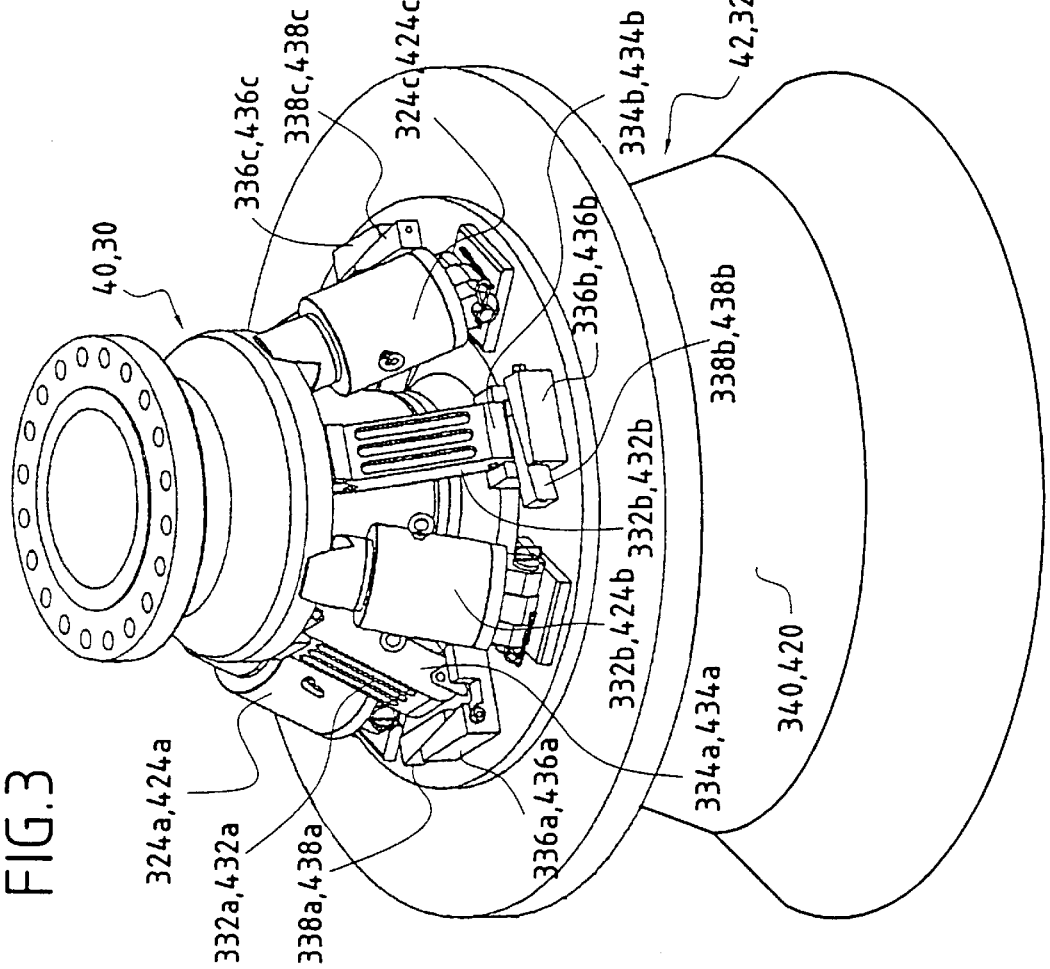
FIG. 3 is a perspective view of means for locking and tensioning the connector of FIGS. 1 and 2.

A transport line is fitted in several steps, as follows. Firstly, the transport line 16 is pulled from one of its ends directly through the female portion 42 of the connector. Unlike in the prior art, this operation is performed by means of a single pulling line 20 actuated by a single winch. In this first stage, it can be noted that the hinged actuators 424a–424d are pushed outwards by the male portion 40 of the connector (FIG. 2a). When the assembly comes into axial abutment, i.e. when the first shoulder 510 comes into contact with the rib 440 on the female connector portion, the actuators find themselves pressed against the male connector portion under the action of the return springs 428a–428d, thereby "snap-fastening" the connector. Operating axial clearance then exists at the actuators (FIG. 2b). Then the rotation of the winch is stopped, and the tension on the pulling line is relaxed, thereby enabling the transport line to rest on the actuators (more precisely on their abutment faces 430a–430d) via the second shoulder 400 of the male connector portion. The operating axial clearance is then transferred to the axial abutment formed by the shoulders 440, 510 (left portion of FIG. 2c). Then, to enable the coupling to operate dynamically in a safe manner, the clearance is taken up by actuating the actuators in the thrust direction (in the direction of the arrow) until a determined tensioning force is obtained that depends on the dynamic loads existing between the support structure and the transport line. This action prestresses the coupling (right portion of FIG. 2c). Finally, to obtain a coupling that is reliable over time, the actuators are replaced with the stays 432a–432d put in place with zero clearance and with a tensioning force that is predetermined by the actuators. Once the stays are in place, the actuators are depressurized (and removed if necessary), and the pre-compression is then transferred to said stays (FIG. 3). The coupling is locked, the pulling line is removed, and the flange collar 44 is then connected to a pipe for supplying the petroleum fluid (not shown). The transport of the fluid can then commence.

Figure 5:
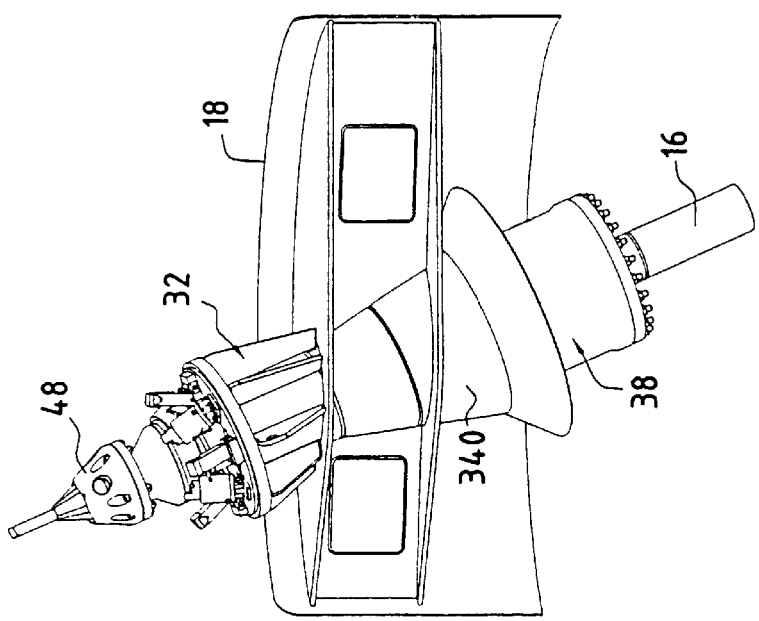
FIG. 5 is a perspective view of the connector of FIG. 1 after fitting.
Figure 4:
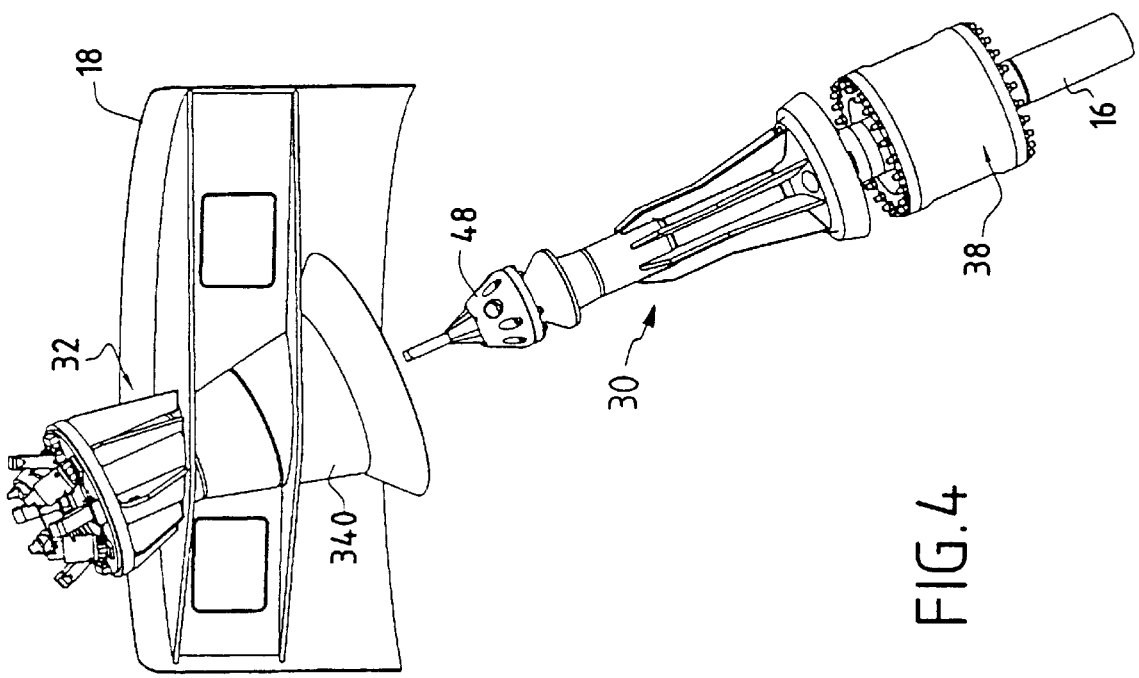
FIG. 4 is a perspective view showing a stage in fitting the connector of FIG. 1.

This fitting principle is applicable similarly to the connector in FIG. 1 that couples the transport line 16 to the mooring buoy 18. FIG. 4 shows the initial step of pulling the line through the female connector portion as guided by the docking cone 340. FIG. 5 shows a following step in which the line is snap-fastened into the connector, prior to being locked with stays. Once locked, the connector is in the position shown in FIG. 3, with the actuators depressurized and the stays under pressure.

It can be understood that this connection system works regardless of the type of transport line (and therefore for all types of riser), regardless of whether or not the line is flexible, and regardless of whether it is provided with a flexible joint assembly. Similarly, the flange collar may optionally be an integral part of the connector. It should also be noted that, although the configuration with stays is preferable, consideration may also be given to replacing the stays with a regulated active system which can be implemented with no particular difficulty by the person skilled in the art.

What is claimed is:

1. A connection device for connecting a submerged tubular structure to a floating support, said connection device comprising:

a first tubular connection element and a second tubular connection element concentric with said first element, the first and second tubular connection elements connecting, respectively to one end of the submerged tubular structure, and to the floating support structure, wherein, said first tubular connection element is provided firstly with a first shoulder cooperating with a corresponding first abutment face of said second tubular connection element to form a first axial abutment in a pulling direction in which the submerged tubular structure is pulled, and secondly with a second shoulder that cooperates with a corresponding second abutment face of said second tubular connection element to form a second axial abutment in a direction opposite from said pulling direction; and a locking and tensioning means positioned between said first and second tubular connection elements and arranged to urge said first and second abutment faces to couple with zero axial clearance therebetween, said locking and tensioning means including at least one actuator secured to said floating support structure and mounted to pivot on said second tubular connection element about a hinge axis and against the effect of a return spring surrounding a pin mounted on said second tubular element so as to enable said first tubular connection element to snap-fasten onto said second tubular connection element.

2. A connection device according to claim 1, wherein said locking and tensioning means further comprise at least one stay put in place at zero clearance and at a predetermined tensioning force by replacing said at least one actuator.

3. A connection device according to claim 2, wherein said locking and tensioning means includes a plurality of said actuators distributed uniformly about the second tubular connection element, one of said stays being disposed between each of said actuators.

4. A connection device according to claim 1, wherein said first tubular connection element is connected to said end of the submerged tubular structure via hinge means.

5. A connection device according to claim 4, wherein said hinge means comprise at least one spherical laminated abutment.

* * * * *